United States Patent [19]
Pauli et al.

[11] Patent Number: 5,427,339
[45] Date of Patent: Jun. 27, 1995

[54] GUIDE AND STORAGE APPARATUS

[76] Inventors: Richard B. Pauli, 3129 Maplewood Dr., Bettendorf, Iowa 52722; Scott L. Martin, P.O. Box 556, Siren, Wis. 54872

[21] Appl. No.: 76,568

[22] Filed: Jun. 14, 1993

[51] Int. Cl.⁶ ............................................. B05B 15/06
[52] U.S. Cl. .................................. 248/75; 188/32
[58] Field of Search ................ 248/75, 76, 79, 80, 248/89, 351, 352; 188/4 R, 5, 32, 36

[56] References Cited

U.S. PATENT DOCUMENTS

| | | |
|---|---|---|
| 1,556,327 | 10/1925 | Hughes . |
| 1,610,112 | 12/1926 | Wendle . |
| 3,297,111 | 1/1967 | Lisboa ................................. 188/32 |
| 3,444,963 | 5/1969 | Davis .................................. 188/32 |
| 3,754,305 | 8/1973 | Kline . |
| 3,800,917 | 4/1974 | Vick ................................... 188/4 R |
| 3,810,530 | 5/1974 | Jay ..................................... 188/32 |
| 4,031,983 | 6/1977 | Lentini ................................. 188/32 |
| 4,778,135 | 10/1988 | Legard ................................... 248/75 |
| 4,884,664 | 12/1989 | Berg .................................. 248/75 X |
| 4,895,225 | 1/1990 | Parnell ................................ 188/32 |

FOREIGN PATENT DOCUMENTS 1305914  8/1962  France .

*Primary Examiner*—Ramon O. Ramirez
*Attorney, Agent, or Firm*—Henderson & Sturm

[57] ABSTRACT

A hose guide and storage apparatus (10) for both preventing a hose (200) from becoming wedged between a tire (100) and the pavement as well as providing a storage vessel for the coils of the hose (200) when the hose (200) is not in use; wherein, the apparatus (10) comprises a flat base member (20) formed integrally with a raised and tapered arcuate collar member (30) having upper (31) and lower (33) lip portions separated by a variable height intermediate portion (32).

5 Claims, 2 Drawing Sheets

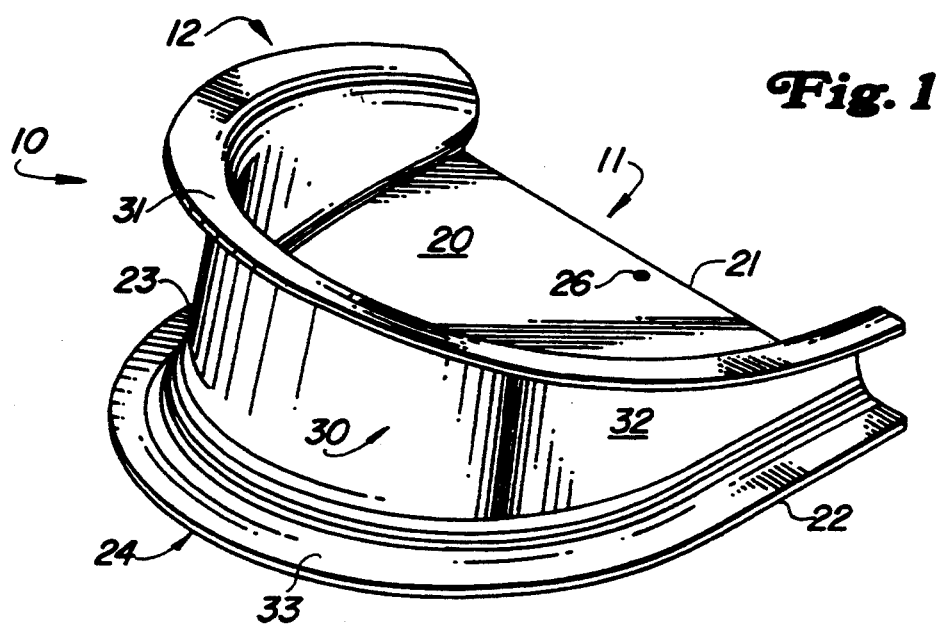
Fig. 1
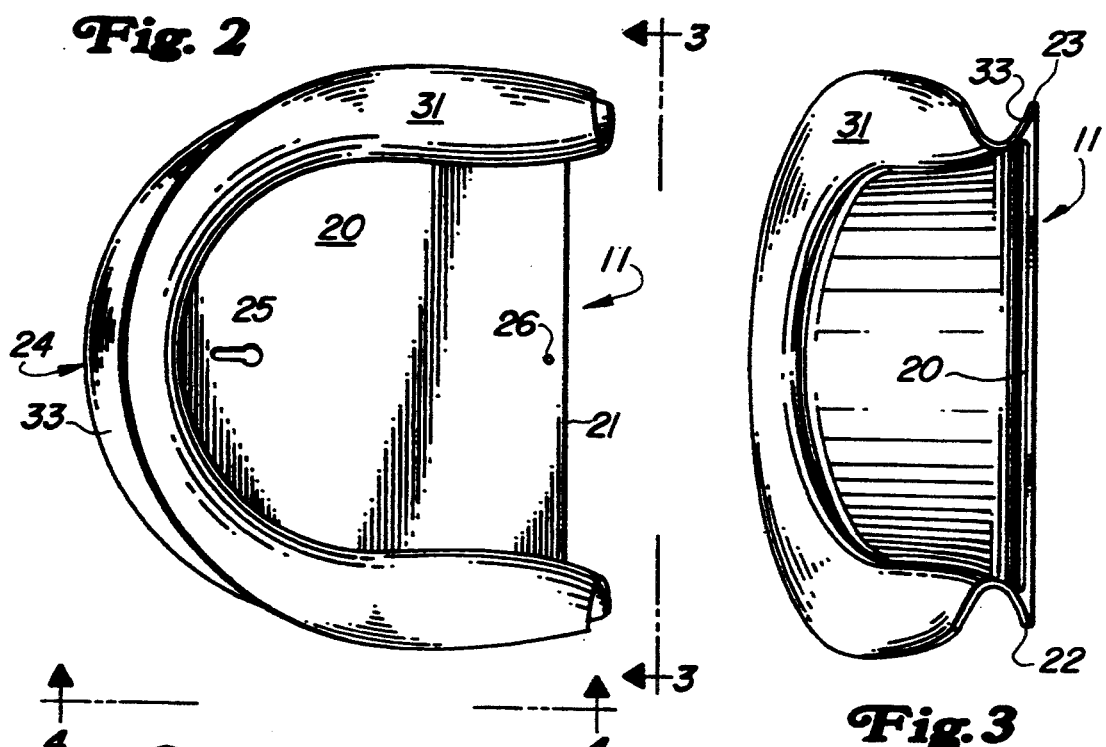
Fig. 2
Fig. 3
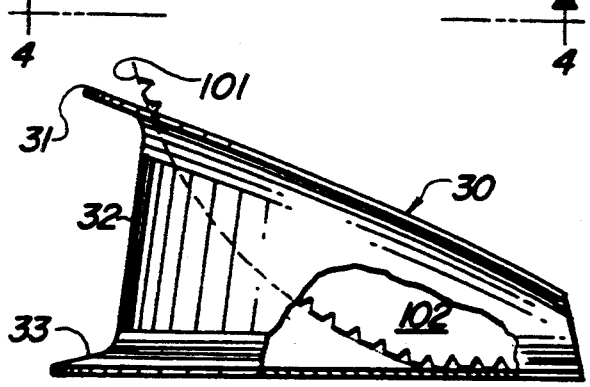
Fig. 4

GUIDE AND STORAGE APPARATUS

TECHNICAL FIELD

The present invention relates to hose guides for vehicle wheels in general; and, in particular, to a hose guide that also serves as a storage vessel for a coiled hose.

BACKGROUND ART

As can be seen by reference to the following U.S. Pat. Nos. 3,754,305; 3,444,963; 3,297,111; and 4,778,135; the prior art is replete with myriad and diverse hose guide and wheel chock apparatus that can under certain circumstances function as a hose guide.

While all of the aforementioned prior art constructions are more than adequate for the basic purpose and function for which they have been specifically designed, none of these patented devices is capable of performing the dual functions inherent in the design and construction of the present invention.

As anyone who has used an air or water hose in the vicinity of a wheeled vehicle is aware, the hose has a propensity to be frictionally engaged between the wheels of a vehicle and the pavement as the hose is moved around the vehicle.

As a consequence of the foregoing situation, there has existed a longstanding need among users of both air and water hoses in the vicinity of a vehicle for a new type of hose guide apparatus which also serves the dual function of providing a storage means for the coiled hose; and, the provision of such a construction is a stated objective of the present invention.

DISCLOSURE OF THE INVENTION

Briefly stated, the hose guide and storage apparatus that forms the basis of the present invention comprises a one piece structural unit which includes a base member, having a raised arcuate tapered collar member formed around a substantial portion of the periphery of the base member; wherein, the lower portion of the collar member is joined with the base member in such a manner as to form a lower arcuate lip element; and, wherein, the upper portion of the collar member is provided with an upper arcuate lip element.

As will be explained in greater detail further on in the specification, the base member is provided to not only act as a stiffening element for the hose guide portion of the apparatus but it also serves to act as a securing wedge to maintain the apparatus in frictional engagement with both the tread of the tire and the pavement; as well as providing a support means for the apparatus when used in the hose storage mode.

In addition, the arcuate contour of the collar member is dimensioned to both receive the sidewalls of a vehicle tire and prevent the apparatus from being laterally displaced relative to the tire while the apparatus is being used as a hose guide.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the hose guide and storage apparatus that forms the basis of the present invention;

FIG. 2 is a top plan view of the apparatus;

FIG. 3 is an end view of the apparatus rotated 90°;

FIG. 4 is left side elevational view of the apparatus;

BEST MODE FOR CARRYING OUT THE INVENTION

Figure 5:
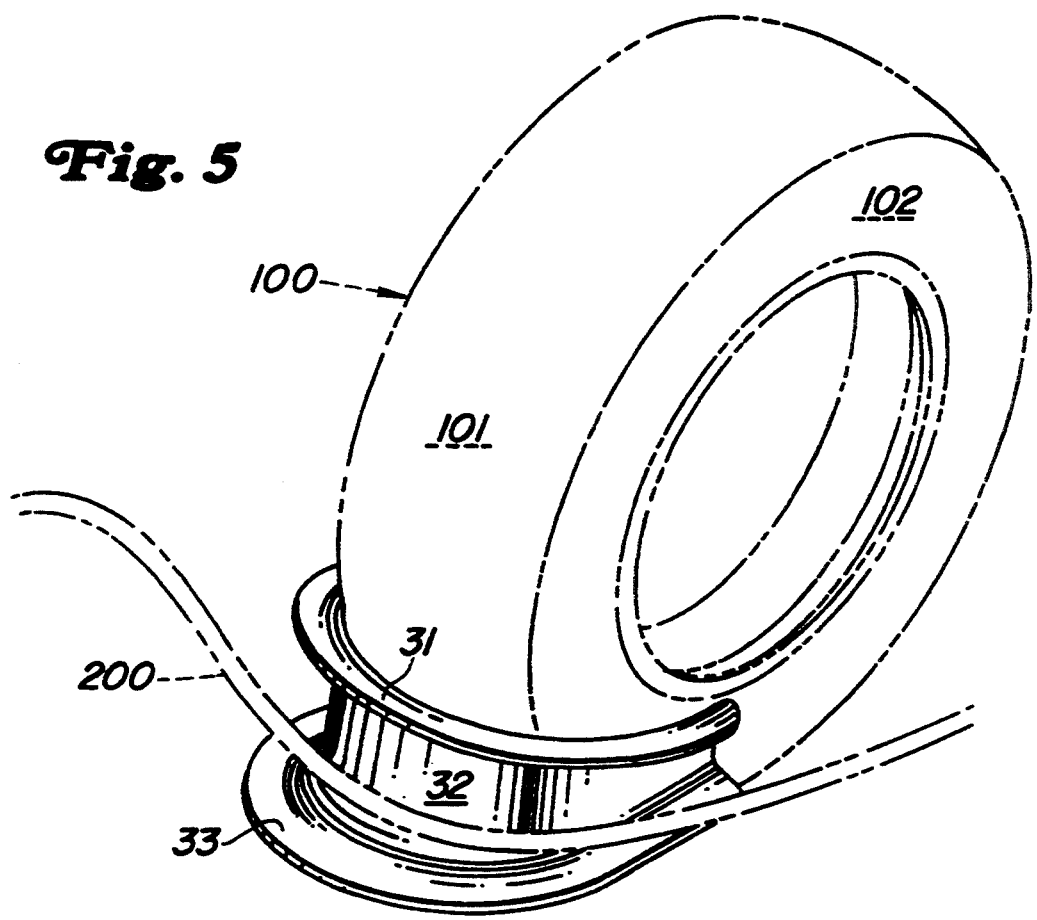
FIG. 5 is a perspective view of the apparatus used as a hose guide.

As can be seen by reference to the drawings, and in particular to FIG. 1, the hose guide and storage apparatus that forms the basis of the present invention is designated generally by the reference numeral (10). The apparatus (10) comprises a base unit designated generally as (11) and an arcuate tapered collar unit which is designated generally as (12). These structural components will now be described in seriatim fashion.

As can best be seen by reference to FIGS. 1 through 3, the base unit (11) comprises a generally thin flat relatively rigid base member (20) having a generally straight trailing edge (21) and sides (22), (23), and a generally arcuate leading edge (24). In addition, the base member (20) is further provided with a plurality of apertures (25) and (26) whose purpose and function will be described in greater detail further on in the specification.

As shown in FIGS. 1 through 4, the collar unit (12) comprises a generally raised and tapered arcuate collar member (30) which extends upwardly from the arcuate leading edge (24) and sides (22)(23) of the base member (20). In addition, the collar member (30) comprises an upper outwardly projecting lip portion (31), a variable height intermediate portion (32) and a lower outwardly projecting lip portion (33).

As can best be appreciated by reference to FIGS. 1 and 5, the intermediate portion (32) of the collar member (30) increases in height as the collar member (30) extends from the trailing edge (21) of the base member (20) to the center of the arcuate leading edge (24) of the base member (20); wherein the interior of the collar member (30) is dimensioned to receive the sidewalls (102) of a vehicle tire (100) when the front of the tread (101) of the tire (100) is resting against the rear surface of the front of the upper lip portion (31) of the collar member (30).

Turning now to FIGS. 4 and 5, it can be seen that when the apparatus (10) is deployed in the hose guiding mode, the trailing edge (21) of the base member (20) may be wedged lightly between the tread (101) of the tire (100) and the pavement upon which the tire rests to maintain the apparatus (10) in its desired position. In addition, the interior sides of the collar member (30) are further designed and dimensioned to engage the sidewalls (102) of the tire (100) to prevent the lateral displacement of the apparatus (10) relative thereto.

As can also be seen by reference to FIG. 5, the minimum height of the intermediate portion (32) of the collar member (30) is dimensioned, so as to loosely receive a length of hose (200), such as an air hose, or a water hose.

In addition, the minimum spacing between the upper (31) and lower (33) lip portions of the collar member (30) must be substantially greater than the diameter of the hose (200) to ensure that the hose will slide freely around the intermediate portion (32) of the collar member (30); and, the maximum spacing between the upper (31) and lower (33) lip portions preferably is at least twice the minimum spacing between the upper (31) and lower (33) portions in order that the apparatus (10) both will form a suitable storage receptacle for the hose (200), as will be explained further on in the specification, and facilitate free flow of the hose (200) past the tire (100) during usage.

As shown in FIGS. 1 through 3, the apparatus (10) is intended to be fabricated as a one piece unit; wherein, the lower lip portion (33) of the collar member (30) merges smoothly into the periphery of the arcuate front (24) and generally flat sides (22)(23) of the base member.

Figure 6:
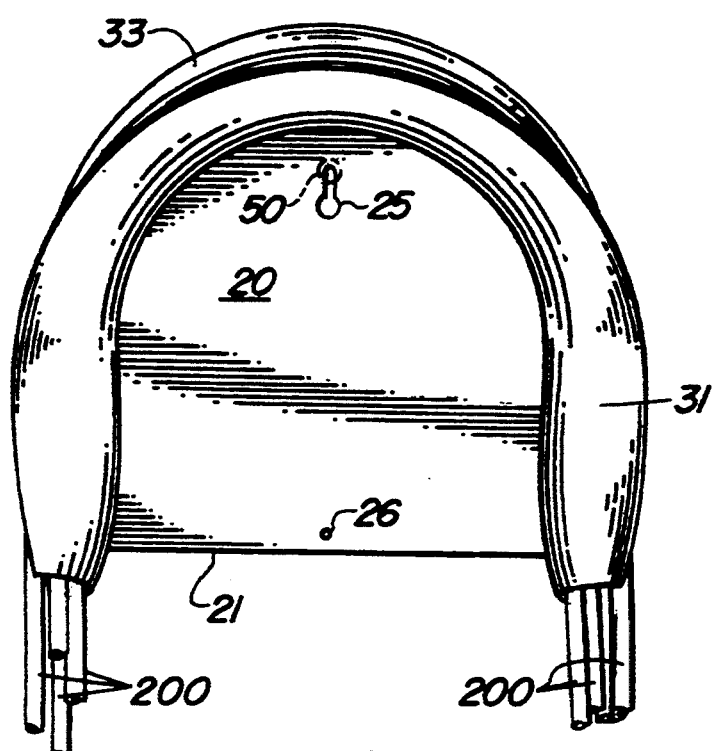
FIG. 6 is a front elevational view of the apparatus used in the hose storage mode.

Turning now to FIGS. 2 and 6, it can be seen that the base member (20) is provided with an enlarged keyhole shaped aperture (25) disposed proximate to but spaced from the arcuate leading edge (24) of the base member (20) a generally discrete circular aperture (26) may be disposed proximate to but spaced from the trailing edge (21) of the base member (20).

When it is desired to employ the apparatus (10) in the hose storage mode, the enlarged head of a conventional fastener (50) (shown in phantom) such as a nail, or screw is inserted through the enlarged portion of the keyhole shaped aperture (25); whereupon, the apparatus (10) is lowered onto the stem of the fastener (50) in a well recognized fashion to suspend the apparatus (10) from a vertical surface. The base (20) may additionally stabilize the apparatus (10) in the storage position such as by pressing against an upright wall from which the fastener (50) may project.

At this juncture, the hose (200) can be draped over the intermediate portion (32) of the collar member (30) in loose coils; wherein, the lip portions (31) and (33) will retain the hose coils (200) on the intermediate portion (32) of the collar member (30).

In addition, the optional discrete aperture (26) is provided to suspend the apparatus (10), from a hook or slim rod (not shown), when the apparatus (10) is not in use. Used separately, or in conjunction with aperture (25), the apparatus (10) can be supported in different orientations to facilitate the cleaning, painting, or other maintenance thereof.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A hose guide and storage apparatus for preventing a hose from becoming wedged between a vehicle tire and the pavement, wherein, the apparatus comprises:

an enlarged collar member having upper and lower outwardly projecting arcuate lip portions connected to one another by an intermediate portion; said collar member having leading and trailing portions connected by said lip and intermediate portions; wherein said intermediate portion increases in height as it extends from said trailing portion of said collar member; and wherein said upper and lower lip portions are spaced apart a dimension greater than the diameter of the hose; and a generally thin flat base member operatively associated with said collar member.

2. The apparatus as in claim 1, wherein, the base member has a generally arcuate leading edge and a generally straight trailing edge and sides.

3. The apparatus as in claim 2, wherein, the lower lip portion of the collar member is operatively attached along the periphery of the leading edge and at least a portion of the sides of said base member.

4. The apparatus as in claim 1, wherein, the base member is provided with at least one aperture for suspending the apparatus from a vertical surface.

5. The apparatus as in claim 4, wherein, said at least one aperture is provided with a keyhole configuration to allow the collar member to form a shallow receptacle for multiple coils of said hose.

* * * * *